United States Patent
Jones-McFadden et al.

(10) Patent No.: US 10,021,565 B2
(45) Date of Patent: Jul. 10, 2018

(54) INTEGRATED FULL AND PARTIAL SHUTDOWN APPLICATION PROGRAMMING INTERFACE

(71) Applicant: BANK OF AMERICA CORPORATION, Charlotte, NC (US)

(72) Inventors: Alicia C. Jones-McFadden, Fort Mill, SC (US); Elizabeth S. Votaw, Potomac, MD (US)

(73) Assignee: Bank of America Corporation, Charlotte, NC (US)

( * ) Notice: Subject to any disclaimer, the term of this patent is extended or adjusted under 35 U.S.C. 154(b) by 48 days.

(21) Appl. No.: 14/928,498

(22) Filed: Oct. 30, 2015

(65) Prior Publication Data

US 2017/0127275 A1 May 4, 2017

(51) Int. Cl.
| | |
|---|---|
| G06F 9/00 | (2006.01) |
| H04W 12/06 | (2009.01) |
| H04L 29/06 | (2006.01) |
| G06F 8/61 | (2018.01) |
| H04W 4/02 | (2018.01) |

(52) U.S. Cl.
CPC ............ *H04W 12/06* (2013.01); *G06F 8/62* (2013.01); *H04L 63/083* (2013.01); *H04W 4/023* (2013.01)

(58) Field of Classification Search
CPC ......... H04W 12/06; G06F 8/62; H04L 63/083
See application file for complete search history.

(56) References Cited

U.S. PATENT DOCUMENTS

| | | |
|---|---|---|
| 3,256,670 A | 6/1966 | Tersigni |
| 5,437,346 A | 8/1995 | Dumont |
| 6,226,752 B1 * | 5/2001 | Gupta ............... G06F 21/33 726/9 |
| 6,256,670 B1 | 7/2001 | Davies |
| 6,651,168 B1 | 11/2003 | Kao et al. |
| 7,111,323 B1 | 9/2006 | Bhatia et al. |
| 7,231,202 B2 | 6/2007 | Natsuno |
| 7,239,226 B2 | 7/2007 | Berardi et al. |
| 7,373,515 B2 | 5/2008 | Owen et al. |

(Continued)

FOREIGN PATENT DOCUMENTS

WO    WO 2014143997 A1 *    9/2014    ............ H04W 4/008

OTHER PUBLICATIONS

QThru.com. "QThru: use your mobile smartphone for self-checkout." http://www http://www.qthru.com/. QThru.com 2011. 6 pages. Retrieved Mar. 22, 2013.

(Continued)

*Primary Examiner* — Shewaye Gelagay
*Assistant Examiner* — Carlton Johnson
(74) *Attorney, Agent, or Firm* — Michael A. Springs; Moore & Van Allen PLLC; Nicholas C. Russell

(57) ABSTRACT

The present disclosure describes an integrated full and partial shutdown application programming interface. Embodiments herein disclosed include receiving an indication that a mobile device of a user is compromised. Further embodiments identify one or more applications associated with the mobile device and remotely access the mobile device to perform a switch-off of the one or more applications. The switch-off may include logging the user out of the one or more applications before removing the one or more applications from the mobile device.

18 Claims, 3 Drawing Sheets

(56) References Cited

U.S. PATENT DOCUMENTS

| | | |
|---|---|---|
| 7,472,081 B1 | 12/2008 | Cason |
| 7,529,741 B2 | 5/2009 | Aravamudan et al. |
| 7,546,276 B2 | 6/2009 | Randle et al. |
| 7,599,287 B2 | 10/2009 | Testa et al. |
| 7,627,505 B2 | 12/2009 | Yoshida et al. |
| 7,693,771 B1 | 4/2010 | Zimmerman et al. |
| 7,697,920 B1 | 4/2010 | McClain |
| 7,698,443 B2 | 4/2010 | Yaffe et al. |
| 7,716,180 B2 | 5/2010 | Vermeulen et al. |
| 7,738,382 B2 | 6/2010 | Le Faucheur et al. |
| 7,783,281 B1 | 8/2010 | Cook et al. |
| 7,930,264 B2 | 4/2011 | Geppert |
| 7,988,045 B2 | 8/2011 | Connell, II et al. |
| 8,012,219 B2 | 9/2011 | Mendez et al. |
| 8,156,335 B2 | 4/2012 | Lin |
| 8,165,945 B2 | 4/2012 | Collins et al. |
| 8,201,232 B2 | 6/2012 | Zhang et al. |
| 8,214,650 B2 | 7/2012 | Dickinson et al. |
| 8,244,210 B2 | 8/2012 | Ayanamcottil et al. |
| 8,261,093 B1 | 9/2012 | Dhesi et al. |
| 8,270,995 B1 | 9/2012 | Manroa et al. |
| 8,286,227 B1 | 10/2012 | Zheng |
| 8,295,812 B1 | 10/2012 | Jones |
| 8,295,898 B2 | 10/2012 | Ashfield et al. |
| 8,307,412 B2 | 11/2012 | Ozzie et al. |
| 8,332,272 B2 | 12/2012 | Fisher |
| 8,352,323 B2 | 1/2013 | Fisher |
| 8,352,730 B2 | 1/2013 | Giobbi |
| 8,369,833 B2 | 2/2013 | McClain |
| 8,380,177 B2 | 2/2013 | Laracey |
| 8,412,626 B2 | 4/2013 | Hirson et al. |
| 8,423,466 B2 | 4/2013 | Lanc |
| 8,442,915 B2 | 5/2013 | Takatori et al. |
| 8,483,194 B1 | 7/2013 | Wu et al. |
| 8,483,663 B1 | 7/2013 | Jones |
| 8,485,438 B2 | 7/2013 | Dollard |
| 8,601,602 B1 | 12/2013 | Zheng |
| 8,644,506 B2 | 2/2014 | Zellner |
| 8,660,358 B1 | 2/2014 | Bergboer et al. |
| 8,682,802 B1 | 3/2014 | Kannanari |
| 8,683,571 B2 | 3/2014 | Zapata et al. |
| 8,744,968 B1 | 6/2014 | Grigg et al. |
| 8,768,838 B1 | 7/2014 | Hoffman |
| 8,769,270 B2 | 7/2014 | Orsini et al. |
| 8,850,575 B1 | 9/2014 | Shaashua et al. |
| 8,869,241 B2 | 10/2014 | Davis et al. |
| 8,869,305 B1 | 10/2014 | Huang |
| 8,881,306 B2 | 11/2014 | Feldman et al. |
| 8,930,271 B1 | 1/2015 | Ellis et al. |
| 8,973,102 B2 | 3/2015 | Jakobsson |
| 2001/0049711 A1 | 12/2001 | Nishihara |
| 2002/0077978 A1 | 6/2002 | O'Leary et al. |
| 2002/0111907 A1 | 8/2002 | Ling |
| 2002/0157029 A1 | 10/2002 | French et al. |
| 2002/0174073 A1 | 11/2002 | Nordman et al. |
| 2002/0186845 A1 | 12/2002 | Dutta et al. |
| 2003/0045328 A1 | 3/2003 | Natsuno |
| 2003/0065805 A1 | 4/2003 | Barnes, Jr. |
| 2006/0030333 A1 | 2/2006 | Ward et al. |
| 2006/0036868 A1 | 2/2006 | Cicchillo |
| 2006/0223518 A1 | 10/2006 | Haney |
| 2007/0055594 A1 | 3/2007 | Rivest et al. |
| 2007/0094152 A1 | 4/2007 | Bauman et al. |
| 2007/0100773 A1 | 5/2007 | Wallach |
| 2007/0113275 A1 | 5/2007 | Khanna et al. |
| 2007/0156842 A1 | 7/2007 | Vermeulen et al. |
| 2007/0168677 A1 | 7/2007 | Kudo et al. |
| 2007/0194884 A1 | 8/2007 | Didier et al. |
| 2007/0219984 A1 | 9/2007 | Aravamudan et al. |
| 2007/0250920 A1 | 10/2007 | Lindsay |
| 2007/0277232 A1 | 11/2007 | Cates et al. |
| 2008/0167965 A1 | 7/2008 | Von Nothaus et al. |
| 2008/0293397 A1 | 11/2008 | Gajdos et al. |
| 2008/0319889 A1 | 12/2008 | Hammad |
| 2009/0019534 A1 | 1/2009 | Bakshi et al. |
| 2009/0075630 A1* | 3/2009 | McLean, IV ......... G06F 21/602 455/411 |
| 2009/0076965 A1 | 3/2009 | Elson et al. |
| 2009/0100529 A1 | 4/2009 | Livnat et al. |
| 2009/0150286 A1 | 6/2009 | Barton |
| 2009/0187492 A1 | 7/2009 | Hammad et al. |
| 2009/0199264 A1 | 8/2009 | Lang |
| 2009/0217346 A1 | 8/2009 | Manring et al. |
| 2009/0254476 A1 | 10/2009 | Sharma et al. |
| 2009/0254975 A1 | 10/2009 | Turnbull et al. |
| 2010/0016001 A1 | 1/2010 | Yang |
| 2010/0039266 A1 | 2/2010 | Faris et al. |
| 2010/0048167 A1 | 2/2010 | Chow |
| 2010/0064345 A1 | 3/2010 | Bentley et al. |
| 2010/0100897 A1 | 4/2010 | Manuel-Devadoss |
| 2010/0122333 A1 | 5/2010 | Noe |
| 2010/0330958 A1 | 12/2010 | Corda et al. |
| 2011/0004921 A1 | 1/2011 | Homer et al. |
| 2011/0007921 A1 | 1/2011 | Stewart, Jr. et al. |
| 2011/0016534 A1 | 1/2011 | Jakobsson et al. |
| 2011/0047075 A1 | 2/2011 | Fourez |
| 2011/0099104 A1 | 4/2011 | Nybom |
| 2011/0137804 A1 | 6/2011 | Peterson |
| 2011/0142234 A1 | 6/2011 | Rogers |
| 2011/0159846 A1 | 6/2011 | Kemshall |
| 2011/0166992 A1 | 7/2011 | Dessert et al. |
| 2011/0167440 A1 | 7/2011 | Greenfield |
| 2011/0208601 A1 | 8/2011 | Ferguson et al. |
| 2011/0252446 A1 | 10/2011 | Jeong et al. |
| 2011/0270618 A1 | 11/2011 | Banerjee et al. |
| 2011/0320296 A1 | 12/2011 | Edwards |
| 2012/0030109 A1 | 2/2012 | Dooley Maley et al. |
| 2012/0054057 A1 | 3/2012 | O'Connell et al. |
| 2012/0089514 A1 | 4/2012 | Kraemling et al. |
| 2012/0095916 A1 | 4/2012 | Dorsey et al. |
| 2012/0120880 A1 | 5/2012 | Lee et al. |
| 2012/0137340 A1 | 5/2012 | Jakobsson et al. |
| 2012/0144468 A1 | 6/2012 | Pratt et al. |
| 2012/0160912 A1 | 6/2012 | Laracey |
| 2012/0171237 A1 | 7/2012 | Ching et al. |
| 2012/0173551 A1 | 7/2012 | Haddorp et al. |
| 2012/0174237 A1 | 7/2012 | Krzyzanowski |
| 2012/0197743 A1 | 8/2012 | Grigg et al. |
| 2012/0197794 A1 | 8/2012 | Grigg et al. |
| 2012/0209773 A1 | 8/2012 | Ranganathan |
| 2012/0230539 A1 | 9/2012 | Calman et al. |
| 2012/0239576 A1 | 9/2012 | Rose et al. |
| 2012/0254941 A1 | 10/2012 | Levien et al. |
| 2012/0254943 A1 | 10/2012 | Li |
| 2012/0265585 A1 | 10/2012 | Muirbrook et al. |
| 2012/0293303 A1 | 11/2012 | Khan et al. |
| 2012/0300938 A1 | 11/2012 | Kean et al. |
| 2012/0316963 A1 | 12/2012 | Moshfeghi |
| 2013/0007874 A1 | 1/2013 | Purvis |
| 2013/0013498 A1 | 1/2013 | Fisher et al. |
| 2013/0030882 A1 | 1/2013 | Davis, III et al. |
| 2013/0030931 A1 | 1/2013 | Moshfeghi |
| 2013/0031003 A1 | 1/2013 | Dorsey et al. |
| 2013/0031004 A1 | 1/2013 | Dorsey et al. |
| 2013/0036037 A1 | 2/2013 | Meredith et al. |
| 2013/0042314 A1 | 2/2013 | Kelley |
| 2013/0046692 A1 | 2/2013 | Grigg et al. |
| 2013/0085927 A1 | 4/2013 | Scott |
| 2013/0097682 A1 | 4/2013 | Zeljkovic et al. |
| 2013/0097683 A1 | 4/2013 | Davis et al. |
| 2013/0097684 A1 | 4/2013 | Kim |
| 2013/0102283 A1 | 4/2013 | Lau et al. |
| 2013/0111208 A1 | 5/2013 | Sabin et al. |
| 2013/0132277 A1 | 5/2013 | Naqvi |
| 2013/0143621 A1 | 6/2013 | Kumaran |
| 2013/0160100 A1 | 6/2013 | Langley |
| 2013/0167207 A1 | 6/2013 | Davis et al. |
| 2013/0173456 A1 | 7/2013 | Grigg et al. |
| 2013/0178233 A1 | 7/2013 | McCoy et al. |
| 2013/0179954 A1 | 7/2013 | Bidare |
| 2013/0188485 A1 | 7/2013 | Midani et al. |
| 2013/0198056 A1 | 8/2013 | Aldrey et al. |
| 2013/0212007 A1 | 8/2013 | Mattsson et al. |
| 2013/0219454 A1 | 8/2013 | Hewinson |

(56) References Cited

U.S. PATENT DOCUMENTS

| | | |
|---|---|---|
| 2013/0267204 A1 | 10/2013 | Schultz et al. |
| 2013/0290361 A1 | 10/2013 | Anderson et al. |
| 2013/0332358 A1 | 12/2013 | Zhao |
| 2014/0089376 A1* | 3/2014 | Caldas .................. H04L 67/10 709/202 |
| 2014/0096215 A1 | 4/2014 | Hessler |
| 2014/0109243 A1* | 4/2014 | Ting ........................ G06F 21/60 726/30 |
| 2014/0122337 A1 | 5/2014 | Kang |
| 2014/0129357 A1 | 5/2014 | Goodwin |
| 2014/0130127 A1 | 5/2014 | Toole et al. |
| 2014/0143149 A1 | 5/2014 | Aissi |
| 2014/0172707 A1 | 6/2014 | Kuntagod et al. |
| 2014/0173704 A1 | 6/2014 | Adams et al. |
| 2014/0208401 A1 | 7/2014 | Balakrishnan et al. |
| 2014/0244503 A1 | 8/2014 | Sadlier |
| 2014/0245391 A1 | 8/2014 | Adenuga |
| 2014/0250009 A1 | 9/2014 | Carlson |
| 2014/0273948 A1 | 9/2014 | Ramprasad |
| 2014/0279270 A1 | 9/2014 | Bertanzetti et al. |
| 2014/0279476 A1 | 9/2014 | Hua |
| 2014/0289821 A1 | 9/2014 | Wilson |
| 2014/0310764 A1 | 10/2014 | Tippett et al. |
| 2014/0315159 A1 | 10/2014 | Mukherjee et al. |
| 2014/0315574 A1 | 10/2014 | Shakespeare et al. |
| 2014/0372743 A1 | 12/2014 | Rogers et al. |
| 2015/0032621 A1 | 1/2015 | Kar et al. |
| 2015/0039601 A1 | 2/2015 | Harrang et al. |
| 2015/0073987 A1 | 3/2015 | Dull |
| 2015/0120572 A1 | 4/2015 | Slade |
| 2015/0161610 A1 | 6/2015 | Sahadevan et al. |
| 2015/0171049 A1 | 6/2015 | Wasserman et al. |
| 2015/0206416 A1 | 7/2015 | Marra et al. |
| 2015/0213474 A1 | 7/2015 | Howe |
| 2017/0126639 A1 | 5/2017 | Jones-McFadden et al. |
| 2017/0199805 A1 | 7/2017 | Cotugno et al. |

OTHER PUBLICATIONS

Tode, Chantal. "Walmart speeds up checkout, lets shoppers scan items via iPhone." Published Sep. Published Sep. 5, 2012. http://www.mobilecommercedaily.com/walmart-speeds-up-checkout-lets-shoppers-scan-items-themselves-via-iphone. Mobile Commerce Daily. 4 pages. Retrieved Mar. 22, 2013.

RISNews.edgl.com. "Supermarket Retailer Rolls Out Self-Checkout Smartphone App." http://risnews.ed http://risnews.edgl.com/retail-news/Supermarket-Retailer-Rolls-Out-Self-Checkout-Smartphone-App81027 2 pages. Retrieved Mar. 3, 2013.

Zimmerman, Ann. "Check Out the Future of Shopping: Shaving Time Off the Weekly Grocery Run to Keep consumers in Stores and Spending." http://online.w http://online.wsj.com/article/5B10001424052748703421204576329253050637400.html. 5 pages. Retrieved Mar. 22, 2013.

Office Action dated Aug. 27, 2015 for U.S. Appl. No. 14/175,701.

* cited by examiner

INTEGRATED FULL AND PARTIAL SHUTDOWN APPLICATION PROGRAMMING INTERFACE

FIELD OF THE INVENTION

This disclosure generally relates to systems and methods for an integrated full and partial shutdown application programming interface (API).

BACKGROUND

Mobile technology allows users to download a variety of applications and functions to their mobile devices. A mobile application may allow users to remotely access to their personal information and perform some actions based on the information. When such a mobile device is misplaced or misappropriated, then the user's information can be jeopardized. Merely uninstalling the applications from a mobile device may not effectively prevent a third party from gaining access to the user's profile by re-installing the application on the mobile device. As such, there exists a need for effective protection of user information when their mobile devices are misplaced or misappropriated.

SUMMARY OF THE INVENTION

The following presents a summary of certain embodiments. This summary is not intended to be a comprehensive overview of all contemplated embodiments, and is not intended to identify key or critical elements of all embodiments nor delineate the scope of any or all embodiments. Its sole purpose is to present certain concepts and elements of one or more embodiments in a summary form as a prelude to the more detailed description that follows.

Systems, computer-implemented methods, and computer program products are described herein that provide for embodiments of an integrated full and partial shutdown application programming interface. With reference to the system, a computer apparatus that comprises at least one processor and a memory may be a part of the system. Additionally, the system may comprise a software module, stored in the memory, comprising computer readable code, executable by the processor, and configured to execute a plurality of steps. Some embodiments of the system comprise receiving an indication to perform a switch-off for a mobile device associated with a user. The system may identify one or more applications associated with the mobile device and remotely access the mobile device to perform the switch-off of the one or more applications. In some embodiments, the switch-off comprises logging the user out of the one or more applications and uninstalling or reconfiguring the one or more applications from the mobile device, wherein uninstalling comprises removing all or part of the one or more applications from the mobile device, and wherein reconfiguring comprises disabling access to the one or more applications.

In some embodiments of the system, the switch-off further comprises confirming that the user is logged out of the one or more applications prior to uninstalling or reconfiguring the one or more applications from the mobile device.

In some embodiments, the system may restore the mobile device to an original state, wherein the original state is a state prior to the switch-off, wherein restoring comprises reinstalling the all or part of the one or more applications that were removed from the mobile device. Additionally, the system may prompt the user to input authentication credentials required for access to the one or more applications and receive, from the user, the required authentication credentials. Furthermore, the system may validate the authentication credentials and re-establish, based on validating the authentication credentials, the user's access to the one or more applications.

In some embodiments of the system, the authentication credentials comprise one or more of a username, a password, a passcode, a personal identification number (PIN), security questions, biometric indicia, device info associated with the mobile device, and financial account information of the user.

In some embodiments of the system, the software module is further configured to notify the user of the switch-off.

In some embodiments of the system, the indication to perform the switch-off comprises an indication that the mobile device is misplaced or lost, that the one or more applications are misappropriated, or that the mobile device and a wearable device of the user are not co-located.

In some embodiments of the system, logging the user out of the one or more applications comprises logging the user out of a first authentication tier but not logging the user out of a second authentication tier.

Computer program product embodiments of the invention may comprise a non-transitory computer readable medium having one or more computer readable programs stored therein, and the computer readable programs, when executed by a computer apparatus, can cause the computer apparatus to perform a plurality of steps.

To the accomplishment of the foregoing and related objectives, the embodiments of the present invention comprise the function and features hereinafter described. The following description and the referenced figures set forth a detailed description of the present invention, including certain illustrative examples of the one or more embodiments. The functions and features described herein are indicative, however, of but a few of the various ways in which the principles of the present invention may be implemented and used and, thus, this description is intended to include all such embodiments and their equivalents.

The features, functions, and advantages that have been discussed may be achieved independently in various embodiments of the invention or may be combined with yet other embodiments, further details of which can be seen with reference to the following description and drawings.

BRIEF DESCRIPTION OF THE DRAWINGS

Figure 1:
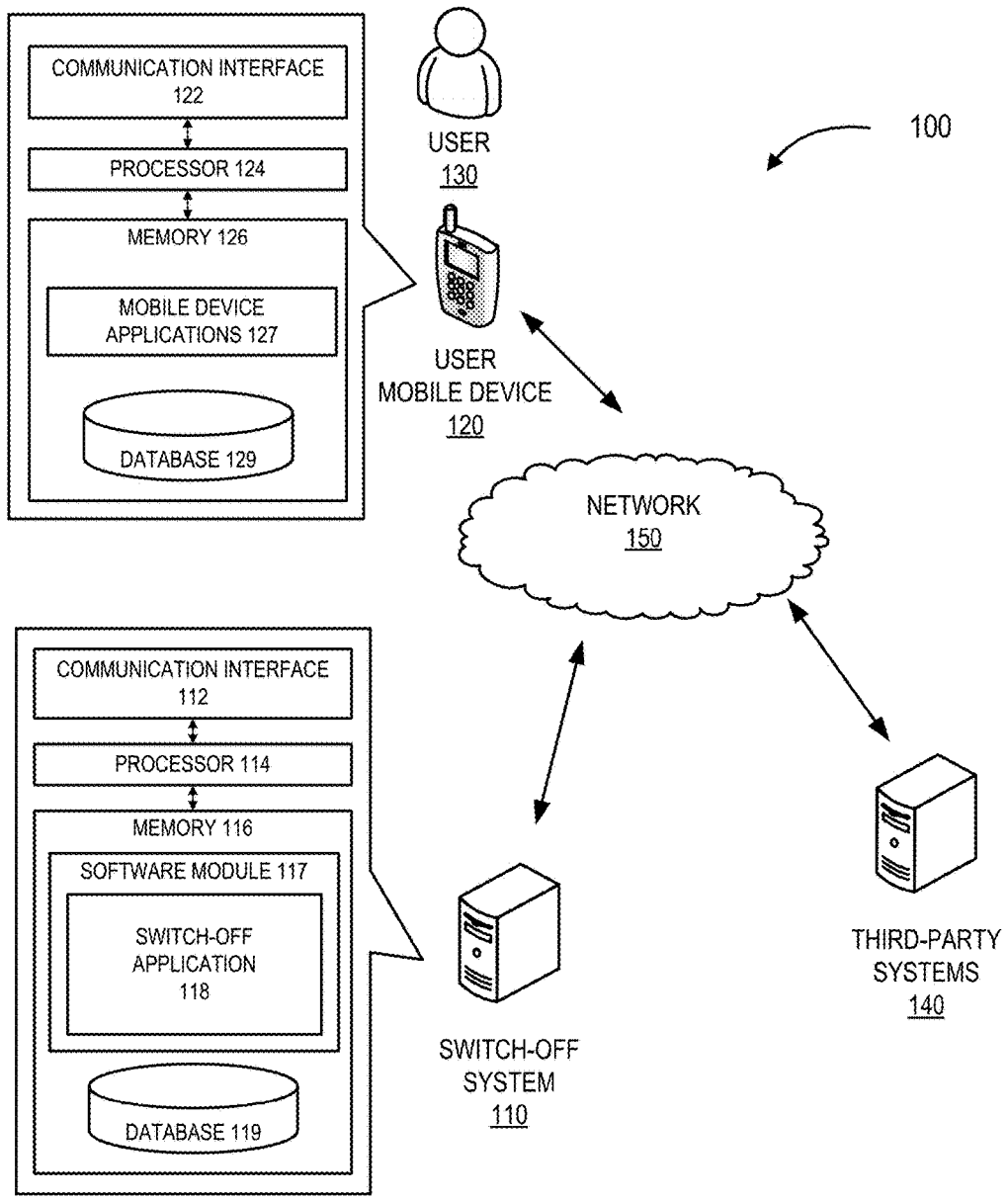
Figure 2:
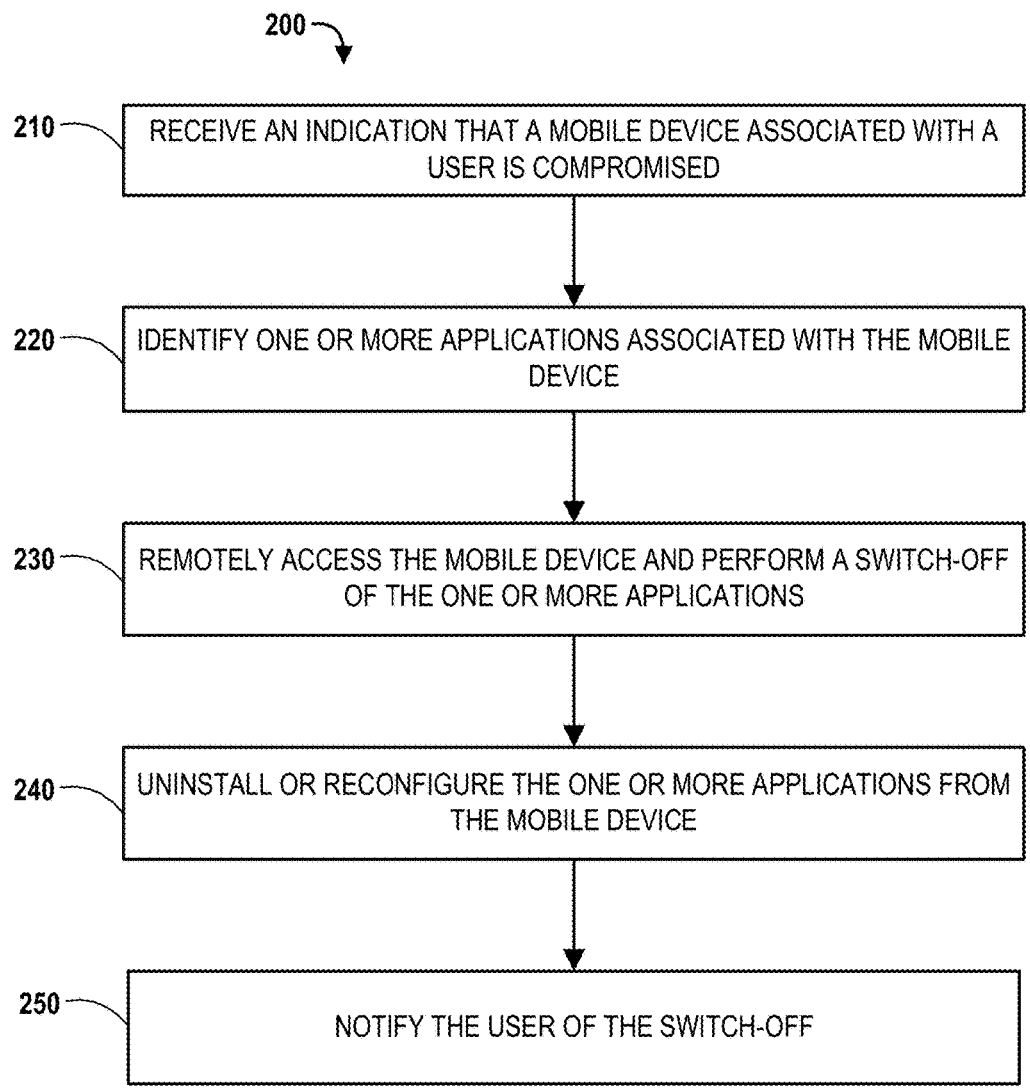
Figure 3:
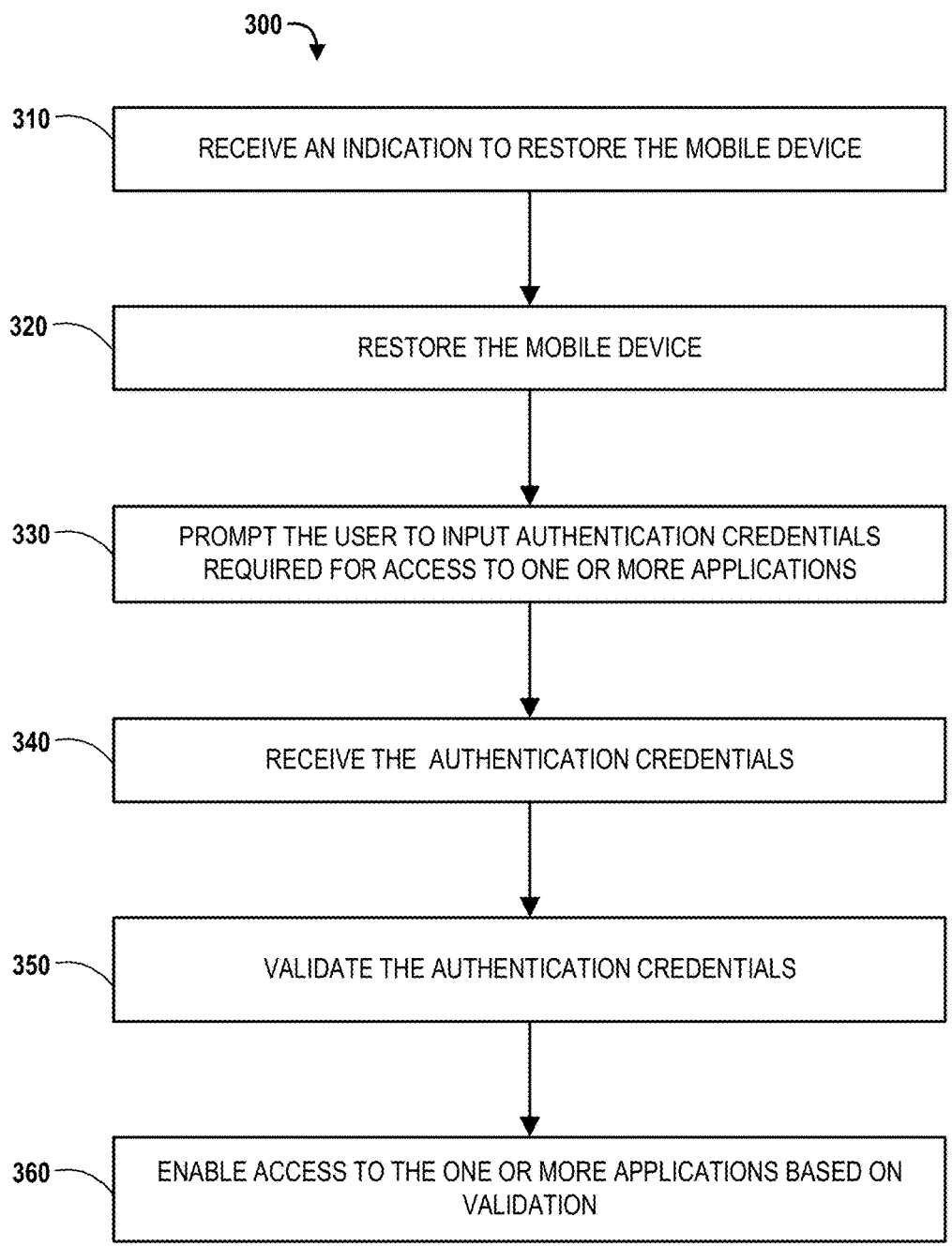

Having thus described embodiments of the invention in general terms, reference may now be made to the accompanying drawings:

FIG. 1 is a block diagram illustrating a system environment including a system for integrated full and partial shutdown API, in accordance with an embodiment of the invention;

FIG. 2 is a flowchart illustrating a general process for performing a switch-off of applications on a mobile device, in accordance with an embodiment of the present invention; and FIG. 3 is a flowchart illustrating a general process for restoring a mobile device, in accordance with an embodiment of the present invention.

DETAILED DESCRIPTION OF EMBODIMENTS OF THE INVENTION

Embodiments of the present invention will now be described with respect to FIGS. 1-3. In view of this description, modifications and alterations to these embodiments or implementations will be apparent to one of ordinary skill in the art.

In the drawings, like reference characters and numbers refer to like elements throughout. Also, the drawings are not necessarily to scale, emphasis instead generally being placed upon illustrating the principles of the invention.

As may be appreciated by one of skill in the art, the present invention may be embodied as a method, system, computer program product, or a combination of the foregoing. Accordingly, the present invention may take the form of an entirely software embodiment (including firmware, resident software, micro-code and the like) or an embodiment combining software and hardware aspects that may generally be referred to herein as a "system." Furthermore, embodiments of the present invention may take the form of a computer program product on a computer-readable medium having computer-usable program code embodied in the medium.

In some embodiments, any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device; or transmission media such as those supporting the Internet, an intranet, or a wireless network. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In some embodiments, the system may use a non-transitory computer readable medium. Additionally, in some embodiments, the system may not use a general computing device, but instead may use a specialized computing device specifically designed and configured to carry out the features of the present invention.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present invention are described below with reference to flowchart illustrations and/or block diagrams of methods, apparatus (systems), and computer program products. It may be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

The present disclosure provides systems, methods and computer products for integrated full and partial shutdown application program interface (API). Generally, the systems and methods herein disclosed perform a switch-off of one or more applications on a mobile device of a user, after receiving an indication to perform a switch-off. The system generally accomplishes the shut-off task by opening the one or more applications on the user device to log out of the applications. The system may then wipe or otherwise remove the one or more applications from the mobile device. By logging out of these applications before removing the applications from the mobile device, the system prevents a third party user from re-installing the application to the mobile device and automatically being logged in to the application under the user's profile. Of course, the system may include other and additional techniques to accomplish this task, including requiring user authorization to re-establish activation of the mobile device and/or the one or more applications on the mobile device, removing cached data on the mobile device, and the like.

Referring now to FIG. 1, a block diagram of a system environment 100 is provided, which includes a switch-off system 110 administrated by a financial institution, a user mobile device 120 operated by a user 130, third-party systems 140, and a network 150. The switch-off system 110, the mobile device 120 and third-party systems 140 communicate with one another over the network 150.

A "system environment," as used herein, may refer to any information technology platform of an enterprise, for example, a national or multi-national corporation, and may include a multitude of servers, machines, mainframes, personal computers, network devices, front and back end systems, database systems and/or the like.

A "financial institution," as used herein, refers to any organization, entity, or business unit in the business of moving, investing, or lending money, dealing in financial instruments, or providing financial services. For example, a financial institution may be a commercial bank, a mortgage company, a credit union, an insurance company, a financial consulting firm, an investment company, or the like.

The term application program interface, or "API," as used herein, refers to a set of programming instructions and standards, or routines and tools for accessing a web-based application. As used herein, the terms "web-based application" and "online application" are interchangeable, both referring to an application that can be accessed through a network connection using an application-level protocol such as the hypertext transfer protocol (HTTP).

As used herein, the terms "customer" and "user" are interchangeable, both referring to a person who is affiliated with a financial institution herein defined.

A "third party," as used herein, refers to any business or non-business units, outside the boundary of the financial institution, which provides services, applications and functions to users, such as websites, social networking media, email servers and the like.

As shown in FIG. 1, the switch-off system 110 includes a communication interface 112, at least one processor 114, and a memory 116. The memory 116 includes a software module 117 including one or more switch-off applications 118 and a database 119. The communication interface 112 may encompass one more network interface cards, ports for connection of network devices, Universal Serial Bus (USB) connectors and the like.

The processor 114 is operatively coupled to the memory 116 and configured to execute the software module 117. The processor 114 may include a digital signal processor device, a microprocessor device, analog-to-digital converters, digital-to-analog converters, and other support circuits. Control and signal processing functions of the processor 114 may be allocated between these devices according to their respective capabilities. The processor 114 may also include functionality to operate other software programs based on computer executable code thereof, which may be stored, along with the switch-off applications 118, on the switch-off system 110.

The memory 116 may include volatile memory, such as RAM having a cache area for the temporary storage of information. The memory 116 may also include non-volatile memory that may be embedded and/or removable. The non-volatile memory may additionally or alternatively include an Electrically Erasable Programmable Read-Only Memory (EEPROM), flash memory, and/or the like.

The software module 117 contains computer readable code executable by the processor 114 and includes the one or more switch-off applications 118. The switch-off applications 118 may perform one or more of the steps and/or sub-steps discussed herein and/or one or more steps not discussed herein.

It will be understood that the switch-off system 110 may be configured to implement various user interfaces, applications and/or process flow described herein. It will also be understood that, in some embodiments, the memory 116 includes other applications. It will also be understood that, in some embodiments, the switch-off system 110 may be configured to communicate with third-party systems 140, for example, for purpose of identifying the mobile device 120 and/or the user 130.

The database 119 may archive information of users affiliated with the financial institution, such as user profiles for access to one or more online banking applications provided by or associated with the financial institution. The database 119 may also store data/results related to and/or used by the switch-off applications 118.

The user mobile device 120, as shown in FIG. 1, includes a communication interface 122, a processor 124 and a memory 126. The memory 126 also includes one or more mobile device applications 127, and a database 129. The one or more mobile device applications 127 may comprise any application for the mobile device accessible by the user 130, a financial institution, a third party system 140 and/or the switch-off system 110. The applications may be related to the financial institution, an online banking system, a social media platform, a merchant platform, a gaming platform, and the like. The user mobile device 120 may, by way of example, comprise a personal digital assistant, a personal computer, an electronic notebook, a mobile phone, a tablet computer, a smart wearable device, and the like.

In some embodiments, the one or more mobile device applications 127 are provided by or associated with the financial institution and include functionality features that allow the user 130 to act on one or more financial accounts associated with the user 130, for example, transferring funds between the accounts, executing account withdrawals or deposits, processing commercial payments related to online bill-pay or peer-to-peer payments, and the like. The financial accounts associated with the user 130 may include one or more deposit accounts, debit accounts, savings accounts, checking accounts, investment accounts, money market accounts, credit accounts, or any combination thereof. In some embodiments, the one or more mobile device applications 127 are provided by third parties through which the mobile device applications 127 or user financial data may be accessed or managed. The mobile device applications 127 may include third-party applications, services and websites, web browser applications, social networking media, email servers and the like.

The third-party systems 140 can be any computerized apparatus controlled or operated by third parties other than the financial institution. In some embodiments, the third-party systems 140 include any system that hosts some functions, services or applications that are installed on the user mobile device 120, or that are accessed or used by the user 130 via the user mobile device 120. In some embodiments, the third-party systems 140 may also provide tools or information to the financial institution for generating certain functionality features for the switch-off system 110.

The switch-off system 110, the user mobile device 120 and the third-party systems 140 are each operatively connected to the network 150 and in communication with one another. The network 150 may include various networking interfaces, such as a LAN, a WAN, a global area network (e.g., the Internet), or a hybrid thereof.

In some embodiments, the switch-off system 110 receives an indication to perform a switch-off for the mobile device 120 of the user 130. In some embodiments, the indication to perform a switch-off of the mobile device 120 of the user 130 is an indication that the mobile device is compromised and may include an indication that the user mobile device 120 is misplaced, lost, or misappropriated, that the mobile device applications 127 are accessed or used by an unauthorized person, and/or that the user mobile device 120 and a wearable device of the user 130 are not co-located. In some embodiments, the indication is reported by the user 130, for example, through a call center of the financial institution. In other embodiments, the indication may be detected by the switch-off system 110. In some embodiments, the indication to perform a switch-off for the mobile device 120 of the user 130 is triggered by an indication from the user that the ownership of the mobile device will transfer. In such an embodiment, a user may securely remove important personal information from the mobile device and uninstall the applications before the mobile device is transferred to a third party. In some embodiments, the user 130 may simply wish to perform a switch-off for the mobile device 120, and therefore may send the notification to the system to perform the switch-off.

In some embodiments, the switch-off system 110 detects that the user mobile device 120 are compromised by determining if the mobile device 120 and a wearable device (not shown) of the user 130 are co-located. In such embodiments, the switch-off system 110 may include a proximity system (not shown), to locate the mobile device 120, which may have a positioning device (not shown) including one or more proximity sensors and/or a global positioning system (GPS), or the like. The wearable device may be paired with the user mobile device 120 via a secure channel between the two devices over a short range wireless communication channel. In other embodiments, the wearable device may include a GPS device which the system switch-off system may use to co-locate the wearable device with the mobile device by monitoring the GPS coordinates of both devices. The switch-off system 110 may determine a geographic location of the mobile device 120 via the proximity system that is configured to use proximity sensors located at various locations throughout the world to detect the presence of the one or more proximity sensors associated with the mobile device 120. Alternatively, triangulation of cellular signals transmitted from the mobile device 120, may be used to identify the location of the mobile device 120. The switch-off system 110 may determine a geographic location of the wearable device via the secure channel previously established.

The switch-off system 110, after receiving the indication to perform a switch-off for the mobile device 120 of the user 130, the system may identify one or more applications (i.e., the mobile device applications 127) associated with the mobile device 120. In some embodiments, identifying the one or more mobile device applications 127 includes comparing the device data provided by the user 130 with the device data archived in the database 119.

After the one or more applications have been identified, the switch-off system 110 remotely accesses the mobile device 120 to perform the switch-off of the one or more applications that are compromised. In some embodiments, the system may establish one or more secure electronic communication channels between the switch-off system 110 and the mobile device 120 of the user 130. Each secure electronic communication channel allows the switch-off system to send signals to the mobile device which cause the mobile device to take certain actions, such as opening an application, logging out of an application, logging into an application, uninstalling an application, reconfiguring an application, installing an application, send messages, and the like. Additionally, the secure electronic communication channels allow the switch-off system to receive communications from the mobile device such as notifications regarding the status of the mobile device and applications associated with the mobile device, and the like.

In some embodiments, the switch-off is implemented by logging the user 130 (or a current user who is unauthorized to use the mobile device) out of the one or more applications. In some embodiments, at least one of the one or more applications is not currently open on the mobile device. In such embodiments, the system may transmit signals to the mobile device to cause the unopened applications to open or load on the mobile device before the system then logs the user out of the application. In some embodiments, switch-off is implemented by force closing the applications. In one embodiment, the system is executed on the mobile device 120 itself, and therefore the system does not need to remotely access the mobile device. In such an embodiment, at least a portion of the system may comprise an application stored on the mobile device 120 of the user 130.

In some embodiments, after having performed a switch-off, the switch-off system 110 may go on to uninstall or reconfigure the one or more applications on the mobile device 120, wherein uninstalling includes removing all or part of the compromised applications and reconfiguring involves disabling access to the applications. In some embodiments, prior to uninstalling or reconfiguring, the switch-off system 110 remotely accesses the mobile device 120 again to confirm that the switch-off is complete. In some embodiments, the system may additionally remove some or all cached data on the mobile device, lock one or more applications that still remain on the mobile device, and the like. In some embodiments, the system continues to record geographical location data associated with the mobile device to monitor the location of the mobile device. In some embodiments, a camera feature of the mobile device may be utilized by the system to help in identifying the operator of the mobile device at the user's request.

In some embodiments, the switch-off system 110 may restore the mobile device 120 to an original state prior to the switch-off, if the mobile device 120 was found or at request by the user 130. In some embodiments, the mobile device 120 is restored by reinstalling the one or more applications that were removed from the mobile device 120.

In some embodiments, after having restored the mobile device 120, the switch-off system 110 prompts the user 130 to provide authentication credentials required for access to the one or more applications that have been reinstalled on the mobile device 120. Upon receiving the authentication credentials from the user 130, the switch-off system 110 validates the authentication credentials and, based on validation, re-establishes the user access to the applications.

FIG. 2 illustrates a general process flow 200 for performing a switch-off on a mobile device, in accordance with an embodiment of the present invention. The process 200 can be executed by the switch-off system 110 in the system environment 100, as shown in FIG. 1.

The process 200 includes multiple steps, executable by a processor of a system, which may be controlled by a financial institution or other operating entity. The process 200 starts with Block 210 to receive an indication to perform a switch-off of a mobile device associated with a user. The user may be the owner of the mobile device or a person who is authorized to use the mobile device and access one or more of the applications. In some embodiments, the indication is reported by the user, for example, through a call center, online reporting center, or other notification system of the operating entity. In other embodiments, the indication may be detected by the system. In some embodiments, the indication that the mobile device of the user is compromised may include an indication that the user mobile device is misplaced, lost, or misappropriated, that the applications are accessed or used by an unauthorized person, and/or that the user mobile device and a wearable device of the user are not co-located. In some embodiments, the indication to perform the switch-off is an indication that ownership of the mobile device will transfer from the user to a third party.

In some embodiments, the system detects that the user mobile device is compromised by determining that the mobile device and a wearable device of the user are no longer co-located. In such embodiments, the system may include a proximity system that monitors global positioning systems (GPS) or the like, associated with both the mobile device and the wearable device. In some embodiments, the wearable device may be paired with the user mobile device via a secure channel between the two devices over a short range wireless communication channel.

Upon receipt of the indication, the process 200 progresses to Block 220 to identify one or more applications associated with the mobile device. In some embodiments, identifying the one or more applications includes comparing the device data provided by the user with the device data archived in the database associated with the switch-off system. In some embodiments, the system identifies the one or more applications by remotely accessing the mobile device and searching for applications installed on the mobile device. In some embodiments, the operating entity and the user will have an agreement in place beforehand that the user desires for specifically identified applications stored on the mobile device of the user to be protected by the system. In such embodiments, the system may store this information in a database, such as the switch-off system database, and retrieve the user-identified applications to be used in the remainder of the system.

The process 200 may then progress to Block 230 to perform a switch-off on the one or more applications on the compromised mobile device. In some embodiments, performing a switch-off includes logging the user out of the one or more applications. In some embodiments, some of the applications are currently open on the mobile device. In such embodiments, the system may enter the open applications, and log the user out of the user's profile for that application. In some embodiments, some of the applications are not currently open on the mobile device. In such embodiments, the system may open the application on the mobile device, enter the newly opened application, and log the user out of the application.

The term "log out," as used herein, refers to any process performed on the mobile device to close a program or application on the mobile device or reduce the level of authorization granted to a possessor of the mobile device. For instance, logging out of an application may comprise completely removing the user's credentials from the application such that the user must completely log back in, possibly with a username and password, before the user can access the application.

In some embodiments, after logging the user out of the one or more applications, the system may check each application to ensure that the user is logged out. If the system determines that the user is not logged out of an application, then the system may attempt to log the user out of the application again and/or notify the user of the inability to log out of the specific application.

In some embodiments, the switch-off may further comprise uninstalling or reconfiguring the one or more applications. The system may uninstall all, some, or none of the applications and, likewise, may reconfigure all, some, or none of the applications. As used herein, the term "uninstall" generally refers to removing all or part of the one or more applications from the mobile device. As used herein, the term "reconfigure" generally refers to disabling access to the one or more applications without uninstalling the reconfigured applications from the mobile device.

In some embodiments, logging out of an application may include adjusting the level of authorization the possessor of the mobile device has for accessing the application. For example, in an online banking application on the mobile device, the system may have multiple tiers of authorization for the user's access to the application, with the lowest level being a simple display of an account balance, a second tier which allows the user to transfer funds from one user-owned account to another user-owned account, and a third tier which allows the user to transfer funds from a user-owned account to a third-party account. The online banking application may only require a password to grant access to the first authorization tier, but may then require more complex or unique authorization keys to access the second and third tiers (e.g., security questions, biometric information, two-step verification codes, and the like). Of course, any possessor of the mobile device has access to whichever tier is currently authorized on the mobile device. Therefore, if the online banking application is currently in the third authorization tier when the system runs the switch-off, the system may enter the application, and reduce the level of authorization to the second authorization tier. In this manner, the system may protect the user's information in the online banking application by limiting the available features of the application, to levels that remain safe to the user, while still allowing the user to access the application at some authorization tier once the mobile device is back with the user and the application is restored on the mobile device. Of course, both the full log out and the tiered authorization log out embodiments may be used by the system, with different embodiments used for different applications.

The process 200 may additionally include Block 240, where the system uninstalls or reconfigures the one or more applications on the mobile device, wherein uninstalling includes removing all or part of the applications that are compromised and reconfiguring involves disabling access to the applications. To accomplish these tasks, the system may remotely access the mobile device, enter an applications manager program, and uninstall or reconfigure settings for at least some of the applications on the mobile device. The system may completely wipe the mobile device of all applications, or may select a predetermined number of applications to remove from the mobile device, at the recommendation or instructions of the user. In one embodiment, the system is executed on the mobile device itself, and therefore the system does not need to remotely access the mobile device. In such an embodiment, at least a portion of the system may comprise an application stored on the mobile device of the user.

In some embodiments, the system does not remove all applications, but instead restricts or blocks access to one or more applications such that a possessor of the mobile device cannot open the applications on the mobile device until the system un-restricts access to the applications. In such an embodiment, the system keeps one or more applications stored on the mobile device at all times, which allows the user to continue using the applications, once the mobile device is restored to its active state, without having to re-install the applications.

In some embodiments, the process 200 may include Block 250, where the system notifies the user of the switch-off. In some embodiments, notifying the user may comprise sending an electronic notification to another device of the user, the other device being a second mobile device, a wearable device, a desktop computer, and the like. In some embodiments, notifying a user may comprise sending a physical email or calling a landline telephone associated with the user to confirm the occurrence of the switch-off.

It should be noted that the steps performed in Blocks 210-240 may be performed by the mobile device itself without the need to remotely access the mobile device. In such an embodiment, at least a portion of the system may comprise an application stored on the mobile device of the user. In some embodiments, all of the steps are performed externally to the mobile device, requiring the system to remotely access the mobile device to accomplish each step. Of course, any combination of internal and external operations of the system may be utilized by the system to accomplish the tasks described with regard to the process 200.

In some embodiments, the mobile device can be restored to an original state prior to the switch-off, if the mobile device was found or at request by the user. FIG. 3 illustrates a general process flow 300 for restoring a mobile device, in accordance with an embodiment of the present invention. Generally, the system prompts the user for authentication credentials, and re-enables one or more features of the mobile device upon validation of the user's credentials.

As shown in FIG. 3, the process 300 may include Block 310, where the system receives an indication to restore the mobile device. In some embodiments, the notification is from the user, is received by the system, and indicates that the mobile device should be restored to its original state, or a similar state. In some embodiments, the notification is determined by the system through monitoring the positioning components of the mobile device and the wearable device of the user to determine that the two devices are co-located again. When the mobile device and the wearable device are co-located, the system may make a strong assumption that the user has possession of the mobile device again. Therefore, the system may automatically restore the mobile device by automatically following through the rest of the process 300 as soon as the co-located nature of the devices is determined.

In some embodiments, the process 300 includes Block 320, where the system restores the mobile device to an original state prior to the switch-off. In some embodiments, restoring the mobile device is implemented by reinstalling the one or more applications that were removed from the mobile device. In such embodiments, the system may remotely access the mobile device, access an application store or other system that enables the downloading of mobile device applications, and installs the one or more applications that were previously removed by the system as part of the process 200 described above.

In some embodiments, restoring the mobile device is implemented by executing a second reconfiguration on the one or more applications that were reconfigured as part of the switch-off process 200. As with reinstallation, the system may remotely access the mobile device, access an application of the mobile device that allows for the manipulation of application statuses, and reconfigure the applications to their original configurations such that the user may again gain access to the applications.

Upon completion of restoring the mobile device, the process 300 progresses to Block 330 to prompt the user to input authentication credentials required for access to the one or more applications. In some embodiments, the authentication credentials include a username, a username, a password, a passcode, a PIN, security questions, and a biometric indicia, device info associated with the mobile device, the user account information, or any combination thereof.

As described above, with reference to Block 230 of FIG. 2, the system may prompt the user to input one or more authentication credentials required for access to one or more authentication tiers for each of the one or more applications. For example, the system may detect that one of the applications that the system previously shut down had three authentication tiers, and the system logged the user out of the second and third authentication tiers before uninstalling the application. The system may then, upon re-installing the application, provide the user with the option to provide authentication credentials for the second authentication tier or the third authentication tier. In this manner, the system allows the user the opportunity to quickly re-establish the desired authentication tier for each of the one or more applications that the system logged the user out of during the switch-off.

In some embodiments, the process 300 includes Block 340, where the system receives the required authentication credentials from the user for each of the one or more newly re-installed applications. The system may receive these authentication credentials via the mobile device itself, or through an alternate means of communication with the user. In some embodiments, the authentication credentials may be the same credentials for all applications. For example, the system may have determined the highest level of authentication credentials in use by the user at the time of the switch-off, and request that the user provide the same authentication credentials to allow the system to log the user back into each of the one or more newly re-installed applications. In this manner, the system may allow the user to resume use of the mobile device in a substantially similar fashion as to the moment before the switch-off occurred, through the input of only one set of authentication credentials.

In another embodiment, the system may require that the user provide authentication credentials for each of the one or more applications that were logged out of during the switch-off. For example, if the system logged the user out of ten applications in the switch-off, then the system may require the user to provide authentication credentials for all ten newly re-installed applications.

In some embodiments, the system may determine the authentication credentials required for each of the one or more applications that the system logs the user out of as part of the switch-off. The system may then group the one or more applications of the mobile device by their required authentication credentials, and allow the user to provide each set of authentication credentials a single time, where each set of authentication credentials allows the system to give the user access to each application with that same set of authentication credentials. Of course, any combination of the example embodiments of authentication credentials and tiers of authentication may be used by the system.

In some embodiments, the process 300 involves Block 350, where the system validates the authentication credentials of the user for each application. In some embodiments, the system has a database of stored authentication credentials based on previous input and/or requests from the user. In some embodiments, the system determines authentication credentials as part of the switch-off process. In such embodiments, the system may store the required authentication for each application in an electronic database. The system may then check the received authentication credentials with the stored authentication credentials to determine if the user's authentication credentials should be validated. In some embodiments, the system validates some authentication credentials, but not other authentication credentials.

For each validated application, the process 300 may include Block 360, where the system re-establishes the user's access to the application on the mobile device of the user. Of course, the user's access to each application may be based on the authentication tier to which the user provided authentication credentials, or on which authentication tier the user was in at the time of the switch-off.

While the foregoing disclosure discusses illustrative embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any embodiment may be utilized with all or a portion of any other embodiment, unless stated otherwise. In this regard, the term "processor" and "processing device" are terms that are intended to be used interchangeably herein and features and functionality assigned to a processor or processing device of one embodiment are intended to be applicable to or utilized with all or a portion of any other embodiment, unless stated otherwise.

Although a number of implementations have been described in detail above, other modifications, variations and implementations are possible in light of the foregoing teaching. The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. As used herein, all numbers may be read as if prefaced by the term "about," even if the term does not expressly appear. Also, any numerical range recited herein is intended to include all sub-ranges subsumed therein. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. Thus, although not expressly described, any or each of the features of the invention disclosed herein may be combined in any manner.

Accordingly, the invention is to be defined not by the preceding illustrative description but instead by the scope of the following claims.

INCORPORATION BY REFERENCE

To supplement the present disclosure, this application further incorporates entirely by reference the following commonly assigned patent applications:

| Docket Number | U.S. Patent Application Ser. No. | Title | Filed On |
|---|---|---|---|
| 6017US1CIP1.014-033.2560 | U.S. patent application No. 14/928,332, now Publication No. 2016/0055326 | DETERMINING USER AUTHENTICATION BASED ON USER/DEVICE INTERACTION | Concurrently herewith |
| 6017US1CIP2.014-033.2561 | U.S. patent application No. 14/928,360, now Publication No. 2016/0055487 | DETERMINING USER AUTHENTICATION BASED ON USER PATTERNS WITHIN APPLICATION | Concurrently herewith |
| 6929US1.014-033.2562 | U.S. patent application No. 14/928,154 | PASSIVE BASED SECURITY ESCALATION TO SHUT OFF OF APPLICATION BASED ON RULES EVENT TRIGGERING | Concurrently herewith |
| 6930US1.014-033.2563 | U.S. patent application No. 14/928,161 | PERMANENTLY AFFIXED UN-DECRYPTABLE IDENTIFIER ASSOCIATED WITH MOBILE DEVICE | Concurrently herewith |
| 6933US1.014-033.2565 | U.S. patent application No. 14/928,392 | TIERED IDENTIFICATION FEDERATED AUTHENTICATION NETWORK SYSTEM | Concurrently herewith |

What is claimed is:

1. A system for integrated full and partial shutdown application programming interface, the system comprising:
   a computer apparatus comprising at least one processor and a memory; and
   a software module, stored in the memory, comprising computer readable code, executable by the processor, and configured to:
      monitor a position of a mobile device associated with a user;
      monitor a position of a wearable device associated with the user;
      determine that the mobile device is compromised by determining that the mobile device and the wearable device associated with the user are not co-located, based on the position of the mobile device and the position of the wearable device associated with the user;
perform a switch-off for the mobile device associated with the user in response to determining that the mobile device and the wearable device associated with the user are not co-located, wherein performing the switch-off for the mobile device comprises:
remotely accessing the mobile device;
identifying one or more applications associated with the mobile device;
identifying unopened applications of the one or more applications associated with the mobile device;
causing the mobile device to open or load the unopened applications;
logging the user out of the one or more applications, wherein logging the user out of the one or more applications comprises:
identifying a first application of the one or more applications with multiple authentication levels;
determining that the user is currently logged in to a first authentication level of the multiple authentication levels; and
logging the user out of the first authentication level for the first application, but not logging the user out of a second authentication level of the first application, where the first authentication level requires more complex user authentication credentials than the second authentication level;
confirming that the user is logged out of the one or more applications; and
in response to confirming that the user is logged out of the one or more applications, uninstalling or reconfiguring the one or more applications from the mobile device, wherein uninstalling comprises removing all or part of the one or more applications from the mobile device, and wherein reconfiguring comprises disabling access to the one or more applications;
determine through monitoring of the mobile device and the wearable device of the user that the mobile device and the wearable device associated with the user are co-located, based on the position of the mobile device and the position of the wearable device associated with the user;
in response to determining that the mobile device and the wearable device are co-located, receive a request to restore the mobile device to an original state, wherein the original state is a state prior to the switch-off, wherein restoring comprises reinstalling the all or part of the one or more applications that were removed from the mobile device and reconfiguring the one or more applications to their original configurations to allow the user to gain access to the one or more applications;
in response to receiving the request to restore the mobile device to the original state, prompt the user to input authentication credentials required for access to each of the one or more applications;
receive, from the user, the required authentication credentials;
validate the authentication credentials;
in response to validating the authentication credentials, install or reconfigure the one or more applications; and in response to validating the authentication credentials, log the user into each of the one or more applications, including logging the user into the first authentication level for the first application.

2. The system of claim 1, wherein the authentication credentials comprise one or more of a username, a password, a passcode, a personal identification number (PIN), security questions, biometric indicia, device info associated with the mobile device, and financial account information of the user.

3. The system of claim 1, wherein the software module is further configured to notify the user of the switch-off by transmitting an electronic notification to a different computing device of the user.

4. The system of claim 1, wherein the second authentication level requires only a password for authentication.

5. The system of claim 1, wherein the first authentication level requires a security question, biometric information of the user, or a two-step verification process.

6. The system of claim 1, wherein the software module is further configured to log a current user of the mobile device out of one or more of the one or more applications.

7. A computer-implemented method for integrated full and partial shutdown application programming interface, the computer-implemented method comprising:
monitoring a position of a mobile device associated with a user;
monitoring a position of a wearable device associated with the user;
determining that the mobile device is compromised by determining that the mobile device and the wearable device associated with the user are not co-located, based on the position of the mobile device and the position of the wearable device associated with the user;
performing a switch-off for the mobile device associated with the user in response to determining that the mobile device and the wearable device associated with the user are not co-located, wherein performing the switch-off for the mobile device comprises:
remotely accessing the mobile device;
identifying one or more applications associated with the mobile device;
identifying unopened applications of the one or more applications associated with the mobile device;
causing the mobile device to open or load the unopened applications;
logging the user out of the one or more applications, wherein logging the user out of the one or more applications comprises:
identifying a first application of the one or more applications with multiple authentication levels;
determining that the user is currently logged in to a first authentication level of the multiple authentication levels; and
logging the user out of the first authentication level for the first application, but not logging the user out of a second authentication level of the first application, where the first authentication level requires more complex user authentication credentials than the second authentication level;
confirming that the user is logged out of the one or more applications; and
in response to confirming that the user is logged out of the one or more applications, uninstalling or reconfiguring the one or more applications from the mobile device, wherein uninstalling comprises removing all or part of the one or more applications from the mobile device, and wherein reconfiguring comprises disabling access to the one or more applications;

determine through monitoring of the mobile device and the wearable device of the user that the mobile device and the wearable device associated with the user are co-located, based on the position of the mobile device and the position of the wearable device associated with the user;

in response to determining that the mobile device and the wearable device are co-located, receiving a request to restore the mobile device to an original state prior to the switch-off, wherein the original state is a state prior to the switch-off, and wherein restoring comprises reinstalling the all or part of the one or more applications that were removed from the mobile device and reconfiguring the one or more applications to their original configurations to allow the user to gain access to the one or more applications;

in response to receiving the request to restore the mobile device to the original state, prompting the user to input authentication credentials required for access to each of the one or more applications;

receiving, from the user, the required authentication credentials;

validating the authentication credentials;

in response to validating the authentication credentials, install or reconfigure the one or more applications; and in response to validating the authentication credentials, log the user into each of the one or more applications, including logging the user into the first authentication level for the first application.

8. The computer-implemented method of claim 7, wherein the authentication credentials comprise one or more of a username, a password, a passcode, a personal identification number (PIN), security questions, biometric indicia, device info associated with the mobile device, and financial account information of the user.

9. The computer-implemented method of claim 7, wherein the computer-implemented method further comprises notifying the user of the switch-off by transmitting an electronic notification to a different computing device of the user.

10. The computer-implemented method of claim 7, wherein the second authentication level requires only a password for authentication.

11. The computer-implemented method of claim 7, wherein the first authentication level requires a security question, biometric information of the user, or a two-step verification process.

12. The computer-implemented method of claim 7, wherein the computer-implemented method further comprises logging a current user of the mobile device out of one or more of the one or more applications.

13. A computer program product for integrated full and partial shutdown application programming interface, the computer program product comprising a non-transitory computer readable medium having one or more computer-readable programs stored therein, and the computer readable programs, when executed by a computer apparatus, cause the computer apparatus to perform the following steps:

monitor, via a computing device processor, a position of a mobile device associated with a user;

monitor, via a computing device processor, a position of a wearable device associated with the user;

determine, via a computing device processor, that the mobile device is compromised by determining that the mobile device and the wearable device associated with the user are not co-located, based on the position of the mobile device and the position of the wearable device associated with the user;

perform, via a computing device processor, a switch-off for the mobile device associated with the user in response to determining that the mobile device and the wearable device associated with the user are not co-located, wherein performing the switch-off for the mobile device comprises:

remotely accessing the mobile device;

identifying one or more applications associated with the mobile device;

identifying unopened applications of the one or more applications associated with the mobile device;

causing the mobile device to open or load the unopened applications associated with the mobile device;

logging the user out of the one or more applications, wherein logging the user out of the one or more applications comprises:

identifying a first application of the one or more applications with multiple authentication levels;

determining that the user is currently logged in to a first authentication level of the multiple authentication levels; and logging the user out of the first authentication level for the first application, but not logging the user out of a second authentication level of the first application, where the first authentication level requires more complex user authentication credentials than the second authentication level;

confirming that the user is logged out of the one or more applications; and in response to confirming that the user is logged out of the one or more applications, uninstalling or reconfiguring the one or more applications from the mobile device, wherein uninstalling comprises removing all or part of the one or more applications from the mobile device, and wherein reconfiguring comprises disabling access to the one or more applications;

determine through monitoring of the mobile device and the wearable device of the user that the mobile device and the wearable device associated with the user are co-located, based on the position of the mobile device and the position of the wearable device associated with the user;

in response to determining that the mobile device and the wearable device are co-located, receive, via a computing device processor, a request to restore the mobile device to an original state, wherein the original state is a state prior to the switch-off, wherein restoring comprises reinstalling the all or part of the one or more applications that were removed from the mobile device and reconfiguring the one or more applications to their original configurations to allow the user to gain access to the one or more applications;

in response to receiving the request to restore the mobile device to the original state, prompt, via a computing device processor, the user to input authentication credentials required for access to each of the one or more applications;

receive, via a computing device processor, from the user, the required authentication credentials;

validate, via a computing device processor, the authentication credentials;

in response to validating the authentication credentials, install or reconfigure, via a computing device processor, the one or more applications; and in response to validating the authentication credentials, log, via a computing device processor, the user into each of the one or more applications, including logging the user into the first authentication level for the first application.

14. The computer program product of claim 13, wherein the authentication credentials comprise one or more of a username, a password, a passcode, a personal identification number (PIN), security questions, biometric indicia, device info associated with the mobile device, and financial account information of the user.

15. The computer program product of claim 13, wherein the computer readable programs cause the computer apparatus to notify, via a computing device processor, the user of the switch-off by transmitting an electronic notification to a different computing device of the user.

16. The computer program product of claim 13, wherein the second authentication level requires only a password for authentication.

17. The computer program product of claim 13, wherein the first authentication level requires a security question, biometric information of the user, or a two-step verification process.

18. The computer program product of claim 13, wherein the computer readable programs cause the computer apparatus to log, via a computing device processor, a current user of the mobile device out of one or more of the one or more applications.

* * * * *